United States Patent [19]

Christensen et al.

[11] Patent Number: 5,000,001

[45] Date of Patent: Mar. 19, 1991

[54] DUAL LOAD-SENSING PASSAGE ADJUSTABLE RELIEF VALVES FOR HYDRAULIC MOTOR CONTROL

[75] Inventors: Thorkild Christensen; Harry S. Nissen, both of Sonderborg; Carsten Christensen, Broager; Siegfried Zenker, Kirchseeon; Svend E. Thomsen, Nordborg, all of Denmark

[73] Assignee: Danfoss A/S, Nordborg, Denmark

[21] Appl. No.: 294,657

[22] Filed: Jan. 9, 1989

[30] Foreign Application Priority Data

Jan. 22, 1988 [DE] Fed. Rep. of Germany ....... 3801829
Dec. 9, 1988 [DE] Fed. Rep. of Germany ....... 3841507

[51] Int. Cl.$^5$ ...................... F15B 11/02; F16H 61/42; F03C 1/08

[52] U.S. Cl. ........................................ 60/450; 91/446; 91/518; 137/596

[58] Field of Search ......................... 60/426, 450, 459; 91/518, 528, 446; 137/596, 596.13

[56] References Cited

U.S. PATENT DOCUMENTS 3,982,469 9/1976 Bianchetta ........................... 91/518
4,051,868 10/1977 Andersen .......................... 91/446 X
4,203,292 5/1980 Deininger ......................... 91/446 X
4,738,103 4/1988 Tha .................................. 91/518 X

*Primary Examiner*—John T. Kwon
*Assistant Examiner*—George Kapsalas
*Attorney, Agent, or Firm*—Wayne B. Easton; Clayton R. Johnson

[57] ABSTRACT

There is provided control apparatus for controlling fluid flow between a bidirectional motor, a pump and a container, and includes a control valve that has a slide operative between neutral and first and second operative positions. A compensating valve is provided in the supply conduit that holds the upstream pressure drop at the control valve substantially constant and is controlled by load pressure sensing circuitry. The load pressure circuitry includes two branches that are connected through a change over valve to the compensating valve. There is provided an over pressure valve and a throttle point in each branch, each branch being connected to a load pressure sensing orifice of the control valve housing and fluidly connected through the slide to one of the housing motor orifices, the one depending upon whether the slide is in its first or in its second position. The circuitry permits the actuating pressure for operating the motor in one direction to be different from that for operating it in the other direction.

12 Claims, 7 Drawing Sheets

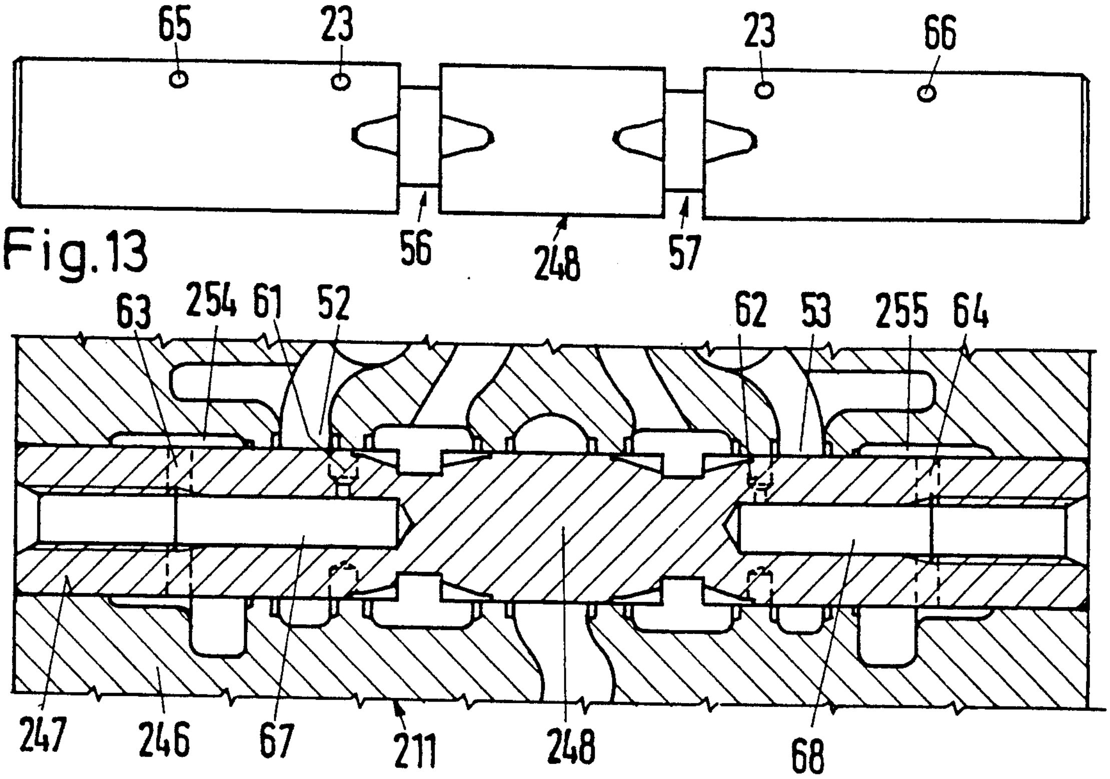
Fig.13
Fig.14
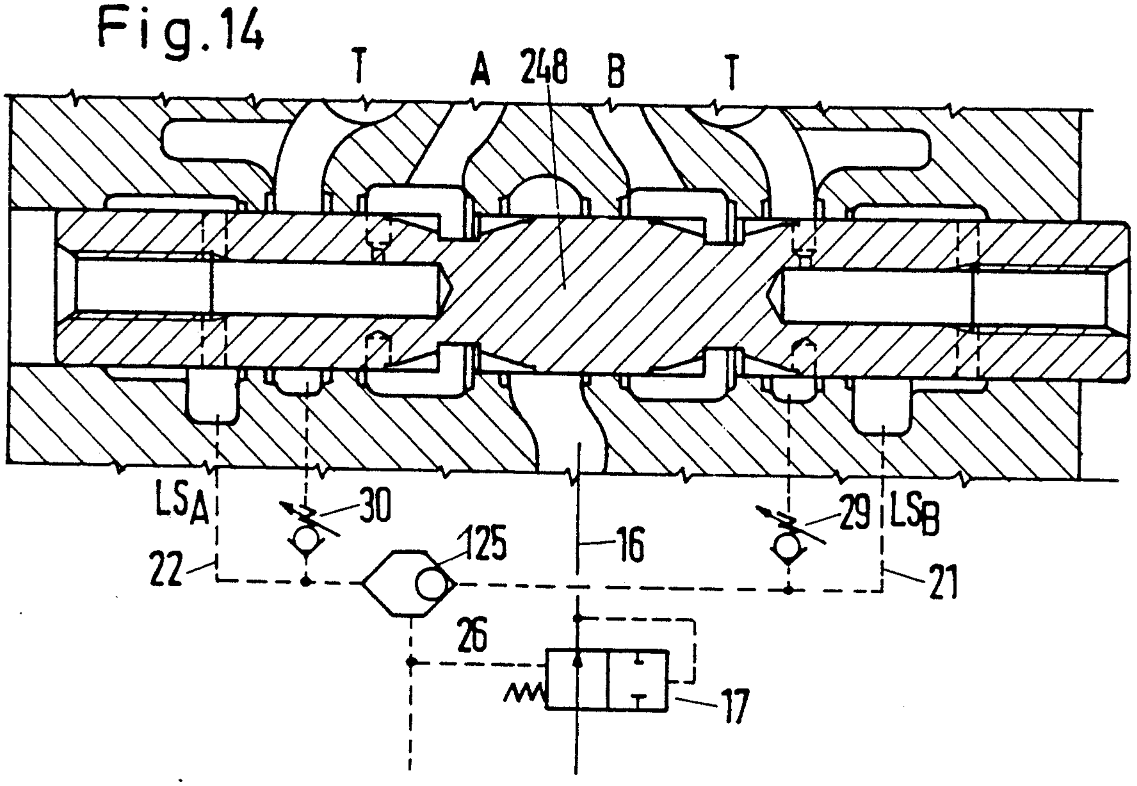

DUAL LOAD-SENSING PASSAGE ADJUSTABLE RELIEF VALVES FOR HYDRAULIC MOTOR CONTROL

BACKGROUND OF THE INVENTION

The invention relates to a control apparatus for a hydraulic motor, comprising a two-directional control valve connectable by a supply conduit to a pump connection, by a discharge conduit to a container connection and by two motor conduits to the motor, a compensating valve in the supply conduit that holds the upstream pressure drop at the control valve substantially constant, and a load pressure conduit which is for influencing the compensating valve and possible the pump pressure and has two starting sections each for joining to a respective load pressure sensing point in the control valve operative depending on the direction as well as a throttling point, a branch conduit and an over-pressure valve therebehind leading to the discharge conduit.

Such control apparatuses are, for example, known from DE-OS 33 02 000 U.S. Pat. No. 4,548,259. The control valve and compensating valve together form a proportional valve in which the position of the control valve slide corresponds to a particular motor speed. The load pressure is tapped at the outlet of the control valve; it, together with a spring, balances the slide of the compensating valve in the opening direction whereas the inlet pressure of the control valve balances it in the closing direction.

If the load pressure exceeds a predetermined value, the over-pressure valve will respond. The discharged pressure medium will cause a pressure drop at the throttle. The opening load of the slide of the compensating valve becomes less. The compensating valve moves in the closing direction. The pressure is limited to the opening pressure of the over-pressure valve. In contrast with pressure relief valves which connect the motor conduit to the container, one has the advantage that only comparatively small amounts of liquid have to be led off. This reduces energy losses and permits one to operate with smaller pumps.

DE-OS 26 56 059 U.S. Pat. No. 3,987,623 discloses a similar control apparatus in which a plurality of blocks, each for one motor, contain a two-directional control valve, a compensating valve and an over-pressure valve and are supplied by a common pump. In this case, the load pressure conduit is directly connected to the two motor conduits by a change-over valve. In each block, the pressure is individually regulated by the compensating valve by the load pressure whereas the pump pressure is influenced by the respective highest load pressure.

SUMMARY OF THE INVENTION

The invention is based on the problem of providing a control apparatus of the aforementioned kind in which the permissible pressure in the motor conduits can have different values depending on the actuating direction.

This problem is solved according to the invention in that each load pressure sensing point is associated with its own over-pressure valve in that a throttling point and a branch conduit with over-pressure valve is provided for each of the two starting sections, and that the starting sections are connected to the rest of the load-pressure conduit by way of a change-over valve.

With this construction of the control apparatus, there are two over-pressure valves which can be set to different response values. The change-over valve ensures that it is always the starting section that is connected to the motor conduit of higher pressure which communicates with the rest of the load pressure conduit. The associated over-pressure valve therefore so co-operates with the throttle in this starting section that, upon response of the over-pressure valve, the pressure drop at the throttle ensures that the compensating valve moves in the closing direction. This applies to both directions of actuation.

It is now possible in the case of a lifting motor to protect the motor conduit that is effective on lifting with a higher pressure, for example 150 bar, and the motor conduit that is effective on lowering with a lower pressure, for example 40 bar. In the case of a grab-tractor, one can limit the maximum pressure acting in the direction of the grabbing force to a higher value than the pressure necessary for the return movement up to an end stop.

Preferably, the over-pressure valves are adjustable. One can therefore adapt to a particular application.

It is particularly favorable for the adjusting apparatuses of the over-pressure valves to be freely accessible. One can in that case adjust the response value even during operation or for each individual load. This is, for example, of interest when a grab is intended to engage alternate objects of different stability.

In particular, the branch conduits may be led out of a valve block containing the remaining valves. This then permits the operation to be conducted from a position remote from the valve block.

It is also recommended that the control and compensating valves for at least two motors be combined, the load pressure conduit of the individual motors each being connected to the associated compensating valve and to each other by way of a change-over valve with an end section leading to a pressure regulator. The combination of such valve blocks is known per se. With such a combination, two different response values for the over-pressure valves can likewise be set in each valve block. The change-over valves ensure that the pump pressure is always influenced by the highest load pressure.

To bring about the rapid and certain actuation of the change-over valves under all operating conditions, different additional measures may be taken and these will be recited hereinafter. They are of particular interest when two or more valve blocks are combined.

In a preferred development, the closure member of the change-over valve is biased by neutral position springs and is lifted off both seats in the rest position. The closure member does therefore not retain the last position that it assumed but returns to the rest position after each actuation of the motor. This is particularly advisable for control apparatuses with a shut-off load pressure conduit in which the closure member is otherwise unable under unfavourable conditions to lift off its seat when compressing a small volume of liquid.

From a construction point of view, it is advisable for the change-over valve to have a closure member in the form of a ball biased in opposite senses by two equal springs, a first seat in the form of a first bushing which supports the end of the one spring and has an inlet at the other end, and a second seat in the form of a step in a second bushing which embraces and retains the first bushing with one end, supports the other spring, has a further inlet at the other end and has an outlet between the seats. In this way, one obtains a change-over valve which is easily made, consists of few parts and can be inserted as a unit in the bore of a valve block.

It is particularly favourable if the respective non-effective load pressure sensing point is relieved towards the container. This predetermines a definite low pressure on one side of the change-over valve so that the change-over value will positively switch to the correct position.

A preferred example comprises a set of check valves which connect the non-effective load pressure sensing point to the container connection but block the effective load pressure sensing point from the container connection. Such check valves can be accommodated in a small space.

In particular, the check valves may be disposed in the slide of the control valve. This does not even make it necessary to enlarge the slide.

From a constructional point of view, it is advisable to provide in the slide two passages which are connected to the load pressure sensing points and from each of which a branch passage with a check valve opening towards the passage leads to a slide control orifice which, depending on the direction, covers a container control orifice or a load pressure control orifice in the housing.

Alternatively, the control valve has control orifices which connect the non-effective load pressure point to the container connection. Only slight changes need to be made to the slide bore and/or housing bore to achieve this function.

A constructionally favourable solution for the control valve is obtained by a housing bore for the control valve that has, on both sides of the pump control orifice, a respective motor control orifice, a container control orifice and a load pressure control orifice, and by an associated slide which has two connecting control orifices to connect the one motor control orifice to the pump control orifice, a sensing point radial passage in the region of each of the opposed ends of the connecting control orifices, and, further radially outwardly, a respective connecting radial passage for connecting the effective load pressure sensing point to the associated load pressure control orifice, an axial passage interconnecting the respective sensing point radial passage and the adjacent connecting radial passage. Such a control valve has take-off points for the load pressure separate from the load pressure control orifices, the load pressure being derived at one of the load pressure sensing points lying more axially inwardly. For this reason, the separate over-pressure monitoring of the load pressure presents no difficulties.

A check valve radial passage may branch off between the sensing points radial passage and the connecting radial passage. Two check valves will then be sufficient.

In particular, an insert receiving the check valve may be provided in the check valve radial passage. This simplifies production.

It is also possible for the load pressure control orifices to extend so far axially outwardly that the connection to the connecting radial passage is maintained when the slide moves outwardly from the neutral position. In this case, the relief towards the container is simply achieved by an axial extension of the load pressure control orifices.

BRIEF DESCRIPTION OF THE DRAWINGS

Preferred examples of the invention will now be described in more detail with reference to the drawing, wherein:

FIG. 12 is a plan view of a slide for the FIG. 11 control valve, FIG. 13 is a longitudinal section through the control valve of FIG. 11 in the neutral position, FIG. 14 shows the same control valve in the operating position.

DETAILED DESCRIPTION OF THE PREFERRED EMBODIMENTS

Figure 1:
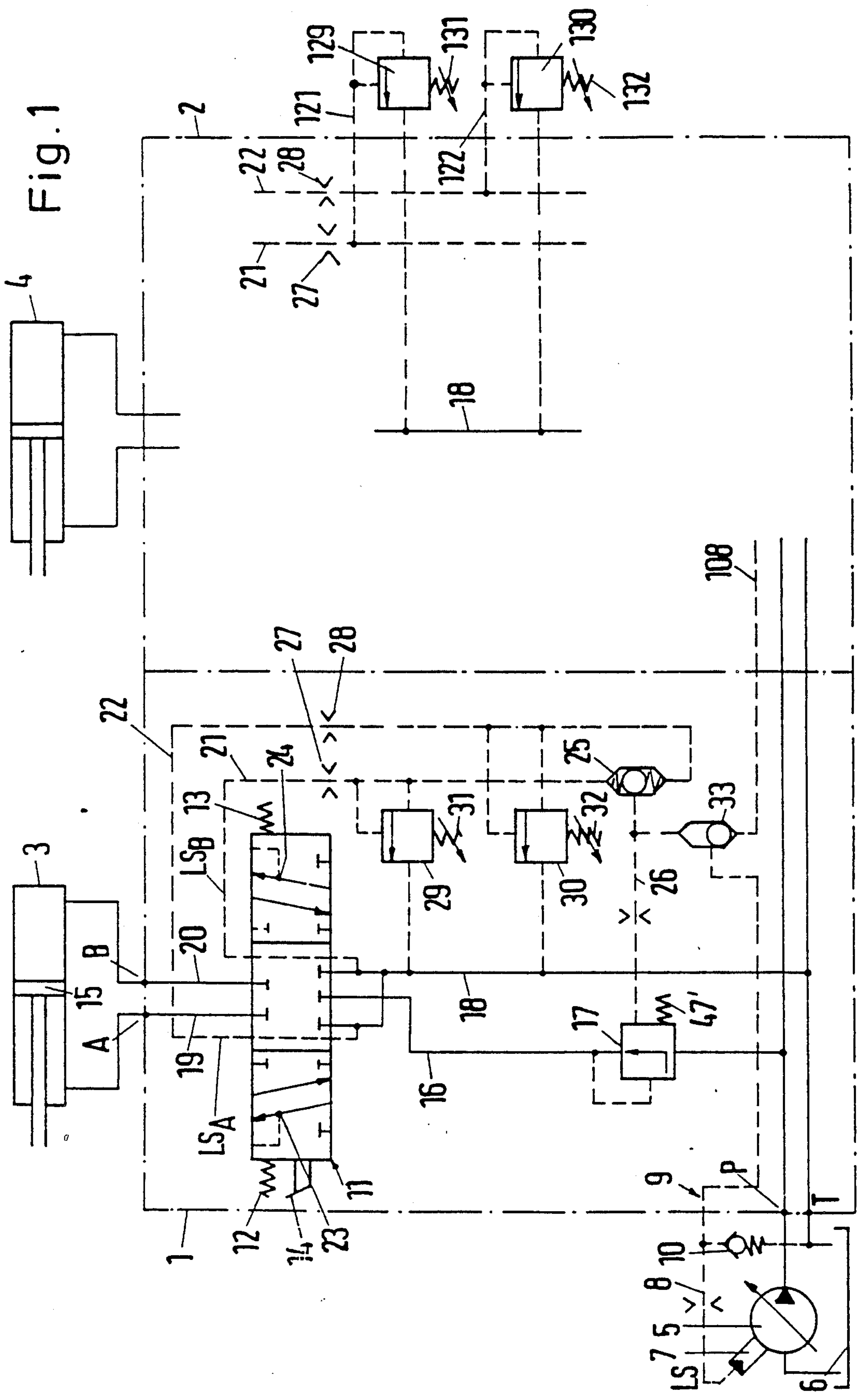
FIG. 1 is a circuit diagram of valve blocks containing the control apparatus according to the invention.

FIG. 1 illustrates two valve blocks 1 and 2 each having a control apparatus for a hydraulic motor 3 or 4. All the valve blocks have a common adjusting pump 5 and a common container 6. The adjusting pump 5 has a conveying volume which is adjustable with the aid of a pressure regulator 7. The pressure regulator is under the influence of the pressure LS in an end section 8 of a load pressure conduit 9. The latter is connected to the container 6 by way of a safety valve 10 which responds at an excessively high pressure.

The vale block 1 contains a control valve 11 which can be brought out of the illustrated neutral position in which it is held with the aid of the springs 12 and 13 into one of two operative positions by means of an adjusting element 14. In the one operating position, the piston 15 of the motor 3 moves to the left and in the other operating position to the right.

For this purpose, the control valve 11 is connected by way of a supply conduit 16 containing a compensating valve 17 to a pump connection P, by way of a discharge conduit 18 to a container connection T and by way of two motor conduits 19 and 20 to two motor connections A or B. In the rest position, all these conduits in the control valve 11 are shut.

The load pressure conduit 9 comprises two starting sections 21 and 22 which are connected to the container conduit 18 in the rest position. In the one operating position, the starting section 22 is connected to a load pressure sensing point 23 at the outlet of the control valve 11 so that a load pressure signal LS is produced which corresponds to the pressure in the motor conduit 19. The other starting section 21 is shut off. In the other operating position, the starting section 21 is connected to the load sensing point 24 so that a load pressure signal $LS_B$ is produced which corresponds to the pressure in the motor conduit 20. The first starting section 22 is shut off.

The two starting sections 21 and 22 are connected by way of a change-over valve 25 to a middle section 26 of the load pressure conduit 9. The load pressure derived at the point 23 or 24 acts, together with a spring 47′, in the opening direction on the compensating valve 17 which is loaded in the opposite direction by the supply pressure of the control valve 11. Consequently, the compensating valve 17 holds the pressure drop at the upstream side of the throttle of the control valve 11 to a value depending on the force of the spring 47. The control valve 11 therefore works as a proportional valve.

Both starting sections 21 and 22 are associated with a respective throttle point 27 or 28. In addition, the starting section 21 is connected by way of a branch conduit to an over-pressure valve 29 and the starting section 22 is connected to the container conduit 18 by way of a branch conduit with an over-pressure valve 30. These over-pressure valves have adjusting apparatuses 31, 32 for setting the pressure at which the valve opens.

If, in an operative position where the sensing pressure point 23 is effective, an over-pressure arises in the motor conduit 19, the over-pressure valve 30 will open. A pressure drop occurs at the throttle point 27. The compensating valve 17 therefore moves to the closing position and the pressure in the motor conduit 19 is limited to the opening pressure of the over-pressure valve. The same applies to the over-pressure valve 29 when the load-pressure sensing point 24 has been made effective. Different response values for the over-pressure valves 29 and 30 can be set with the aid of the adjusting apparatuses 31 and 32.

The internal construction of the valve block 2 corresponds to that of the valve block 1 of FIG. 1. The only difference is that the over-pressure valves 129 and 130 as well as the associated branch conduits 121 and 122 are led out of the valve block 2. The adjusting apparatuses 131 and 132 are therefore freely accessible. They can also be actuated during operation In order that the pressure regulator 7 of pump 5 will always receive the load pressure LS of the motor that is loaded most strongly, a change-over valve 33 is provided which is connected on the one hand to the end section 108 of the load pressure conduit 9 of the valve block 2 and on the other hand to the middle section 26 of the load pressure conduit 9 in the valve block 1.

Figure 2:
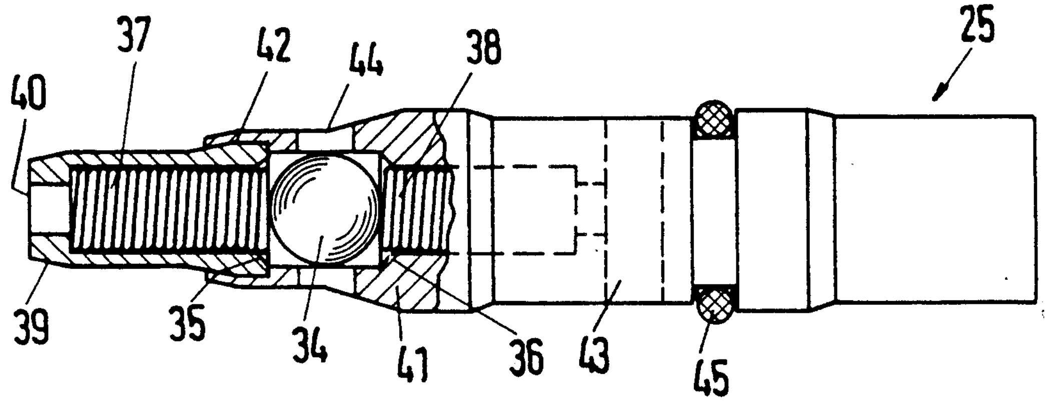
FIG. 2 is a longitudinal part-section through a change-over valve that can be used according to the invention.

One embodiment of a change-over valve 25 is shown in more detail in FIG. 2. This valve can be inserted as a unit in a bore of the valve block 1. The closure member is a ball 34 which can co-operate with two valve seats 35 and 36. The ball is equally loaded from both sides by equal springs 37 and 38 so that it is normally held between the two seats. The seat 35 is formed by the end of a bushing 39 which has at the opposite end an inlet 40 which, for example, is connected to the starting section 21. In addition, the bushing 39 receives the spring 37. The other seat 36 is formed by a stop in a second bushing 41 which embraces the bushing 39 and retains it with a boaded rim 42. The bushing 41 receives the spring 38 and has an inlet 43 which is formed by a transverse bore and is, for example, connected to the starting section 22. An outlet 44 is disposed between the two seats 34 and 36. This outlet is, for example, connected to the central section 26. Upon insertion in the bore of a valve block, a sealing ring 45 seals against the outside.

It will be assumed that the closure member 34 is pressed against the seat 36 by the excess pressure at the inlet 40. When this has taken place, the closure member returns to the illustrated rest position under the influence of the springs. If the springs were to be omitted, it would remain in its sealed position against the seat 36. If an excess pressure were now to occur at the inlet 43, the closure member 34 would first have to compress a small amount of liquid in order to lift off the seat 36. This is often impossible when the load-pressure conduit 9 is shut and therefore the operation would be defective. Shutting takes place especially when the change-over valve 33 closes the central section 26 because of higher loading of another motor. The springs therefore give increased operability.

The amount of pressure fluid to be compressed can flow by way of the change-over valve 25 to one of the outlets A or B. The springs 37 and 38 ensure that the closure member 34 assumes the correct position in which there is no trapped liquid. Without springs, there is the danger that the closure member will lie against the wrong seat when inclined and this would lead to the trapping of liquid.

Figure 3:
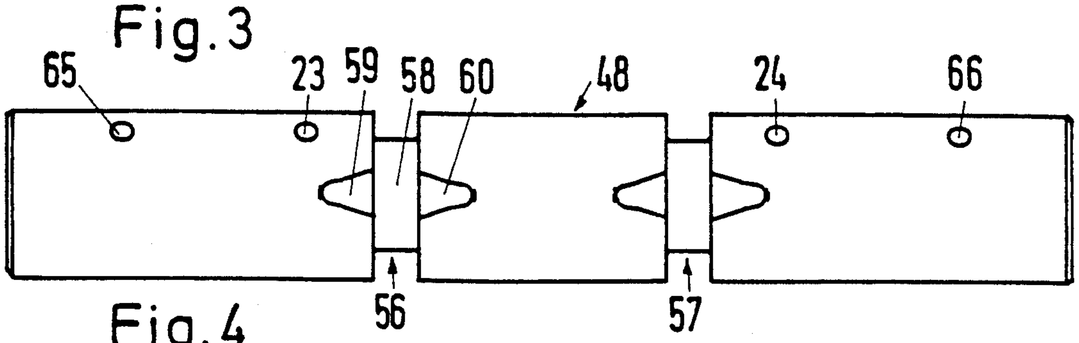
FIG. 3 is a plan view of the slide for the control valve of FIG. 1.
Figure 4:
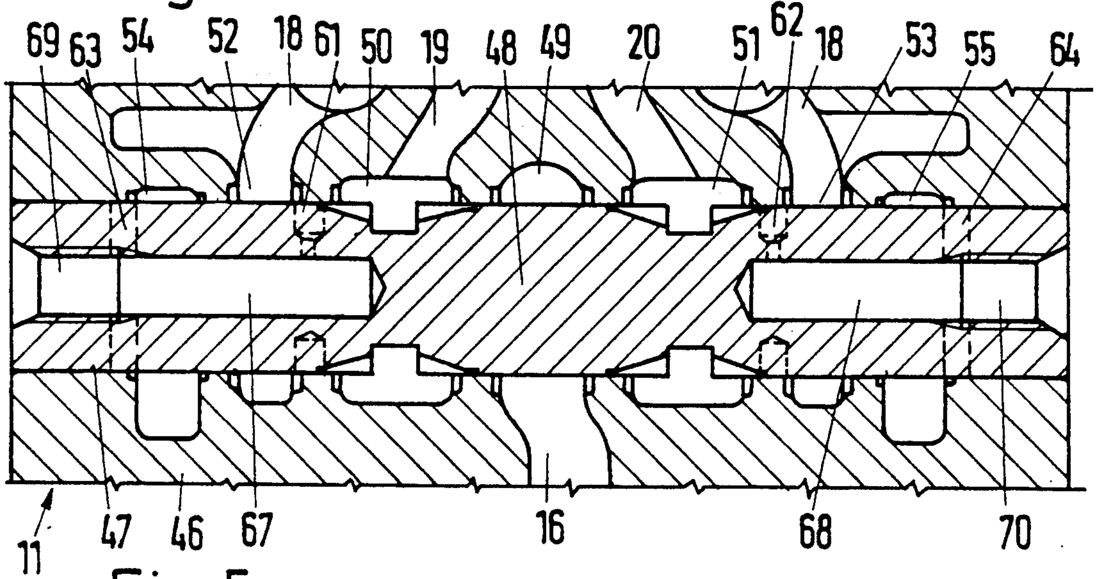
FIG. 4 is a longitudinal section through the control valve of FIG. 1 in the neutral position.
Figure 5:
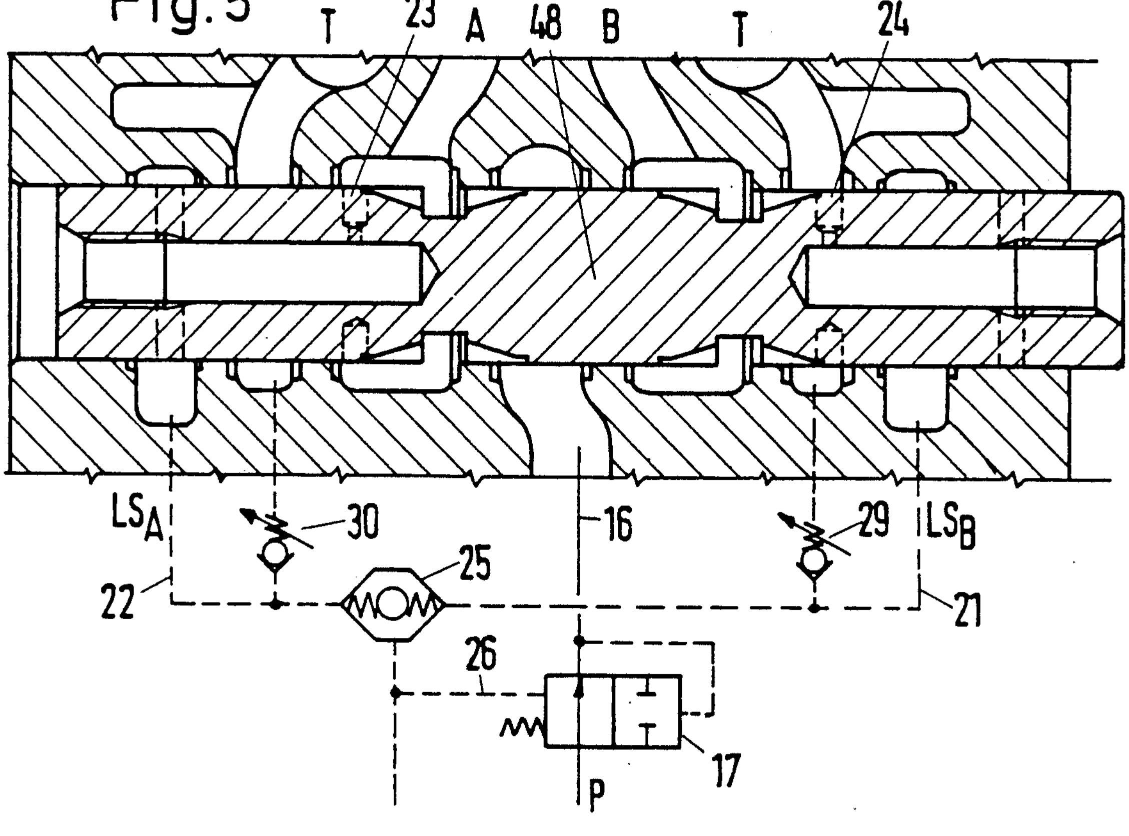
FIG. 5 shows the same control valve in the operating position.

As is shown in FIGS. 3 to 5, the control valve 11 has a housing 46 with a bore 47 in which there is a slide 48. The housing bore 47 has in the centre a pump control orifice 49 which is connected to the pump inlet P by way of the compensating valve 17. On both sides thereof, there are motor control orifices 50 and 51 connected to the motor connections A and B, respectively. Outside same, there is a respective container control orifice 52 and 53 connected to the container connection T. Finally, a respective load pressure control orifice 54 or 55 is provided on the outside, from which the starting sections 21 and 22 of the load pressure conduit 9 branch off. All these control orifices are in the form of annular grooves.

The associated slide 48 has two connecting control orifices 56 and 57 each consisting of an annular groove 58 and at least two pairs of throttle grooves 59 and 60. In the region of the opposed ends of the connecting control orifices 56 and 57, there is a respective sensing point radial passage 61 or 62 of which the mouth forms the load pressure sensing point 23 or 24. Axially beyond same, there is a respective connecting radial passage 63 or 64 of which the mouth 65 or 66 is adapted to form a connection to the load pressure control orifices 54 or 55. The radial passages 61 and 63 are interconnected by way of an axial passage 67 and the radial passages 62 and 64 by way of an axial passage 68. The axial passages are formed by blind holes, each closed at the end by a screw 69 or 70.

In the neutral position shown in FIG. 4, the pump control orifice 49 is shut. The starting sections 21 and 22 of the load pressure conduit 9 are connected to the container conduit 18 by way of 54-63-67-61-52 or 55-64-68-62-53.

If, now, the slide 48 is pushed to the right, as is shown in FIG. 5, the connecting control orifices 56 and 57 of the slide 48 bring about a connection between the pump control orifice 49 and the motor control orifice 50 or between the motor control orifice 51 and the container control orifice 53. Further, the load pressure sensing point 23 has come into communication with the motor control orifice 50 and the load pressure sensing point 24 with the container control orifice 53. Only the load pressure $LS_A$ is effective and this is passed to the starting section 22 by way of 61-67-63-54. The load pressure sensing point 24 is non-effective because the connecting radial passage 64 is covered by the bore 47.

The embodiment of FIGS. 6 to 10 for the most part corresponds to that of FIGS. 1 to 5. Consequently, the same parts are given the same reference numerals. Difference reside principally in the region of the control valve 111 with its housing 146 and its slide 148 as well as in the omission of the springs for the change-over valve 125.

Figure 6:
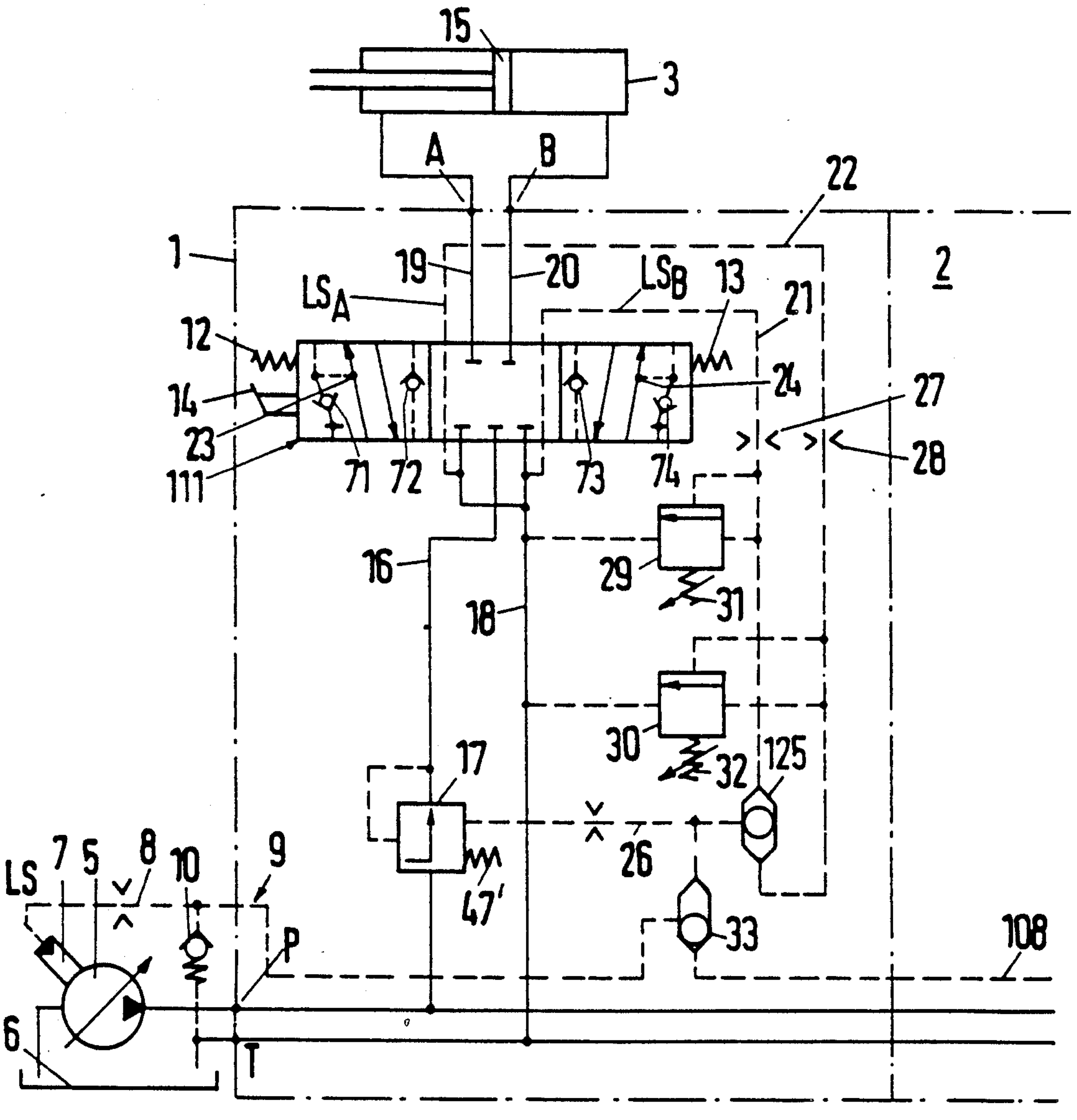
FIG. 6 is a circuit diagram of valve blocks with a modified control apparatus.
Figure 8:
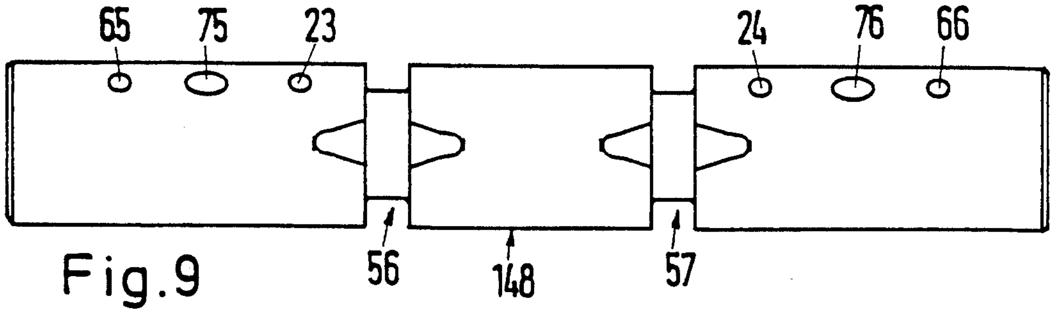
FIG. 8 is a plan view of a slide for the FIG. 6 control valve.
Figure 9:
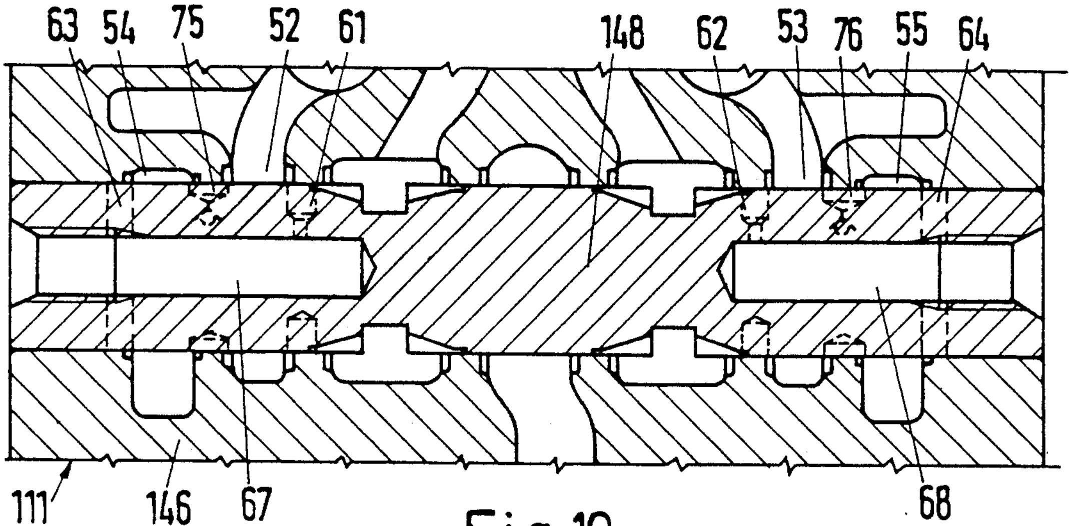
FIG. 9 is a longitudinal section through the control valve of FIG. 6 in the neutral position.

The circuit diagram of FIG. 6 shows four check valves 71, 72, 73 and 74 which become effective in pairs in the operating positions and connect the non-effective load pressure sensing point to the container connection but block the effective load pressure sensing point from the container connection.

In a practical embodiment, this is solved so that a check valve radial passage 75 is arranged between the sensing points radial passage 61 and the connecting radial passage 63, the passage 75 extending from the axial passage 67. Similarly, a check valve radial passage extending from the axial passage 68 is disposed between the sensing points radial passage 62 and the connecting radial passage 64.

Figure 10:
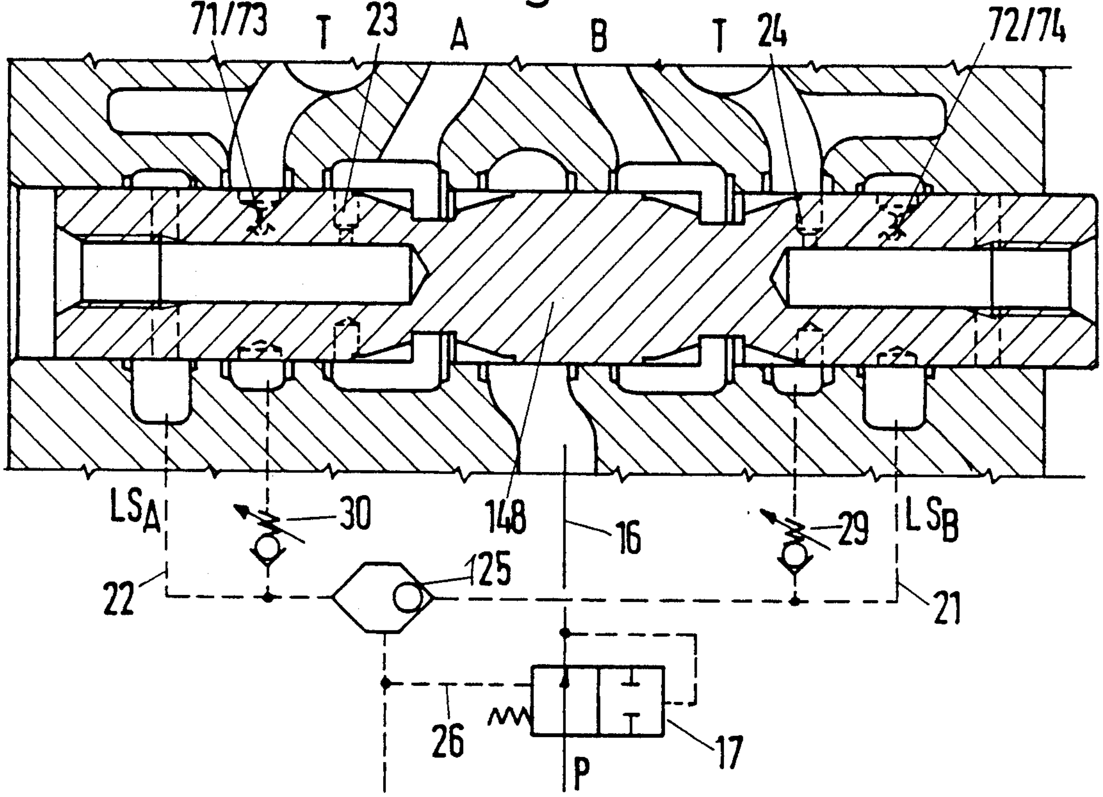
FIG. 10 shows the same control valve in the operating position.
Figure 11:
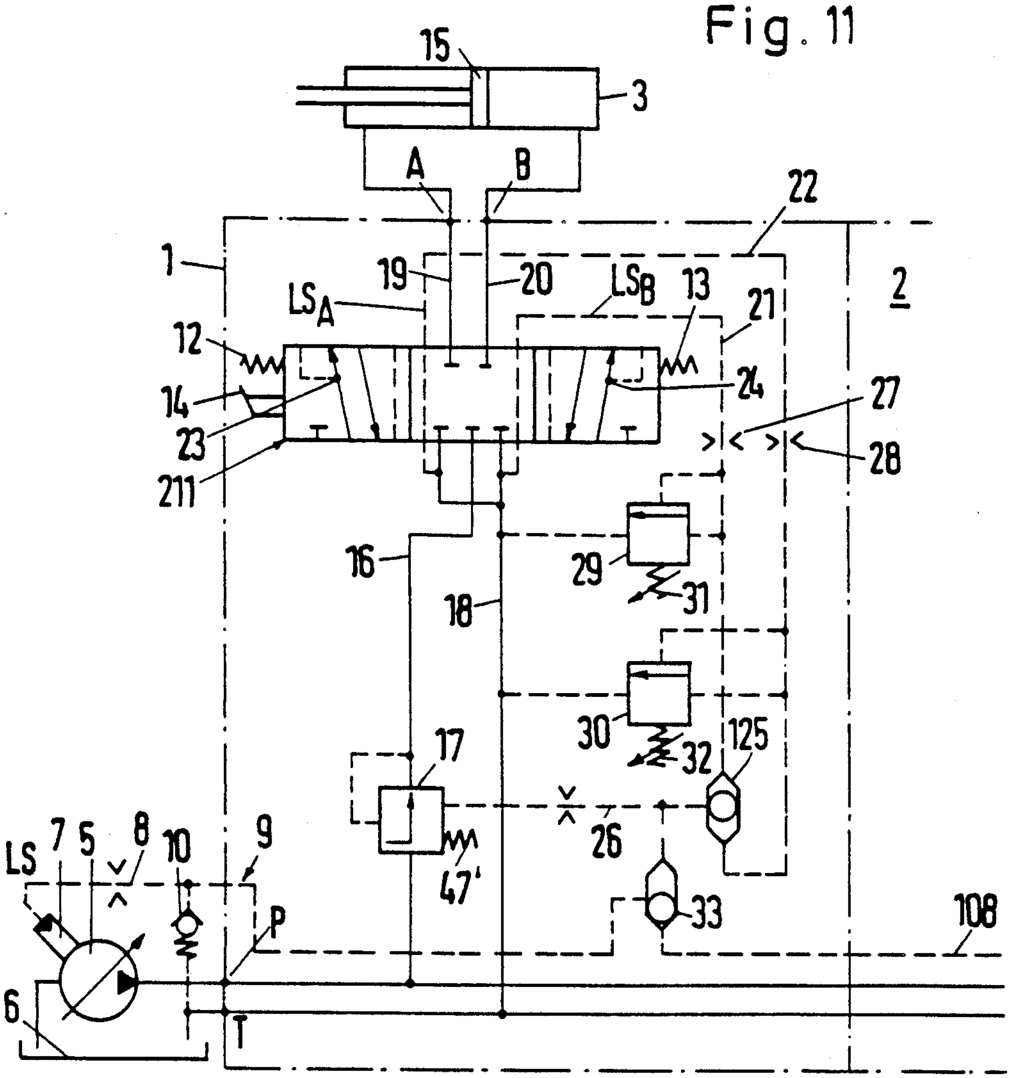
FIG. 11 is a circuit diagram of valve blocks with a modified apparatus.

If the slide 148 is brought into the operative position of FIG. 10, the check valve radial passage 75 comes into communication with the container control orifice 52 and the check valve radial passage 76 with the load pressure control orifice 55. As a result, the associated check valve opens and the pressure in the non-effective starting section 21 can be relieved to the container control orifice 53 by way of 76-68-62. Conversely, the effective load pressure $LS_A$ in the axial passage 67 ensures that the check valve in the radial passage 75 is kept closed.

In this construction, two check valves 71/73 and 72/74 will suffice. In one operating position they have the function of the valves 71 and 72 and in the other operating position they have the function of the valves 73 and 74.

Figure 7:
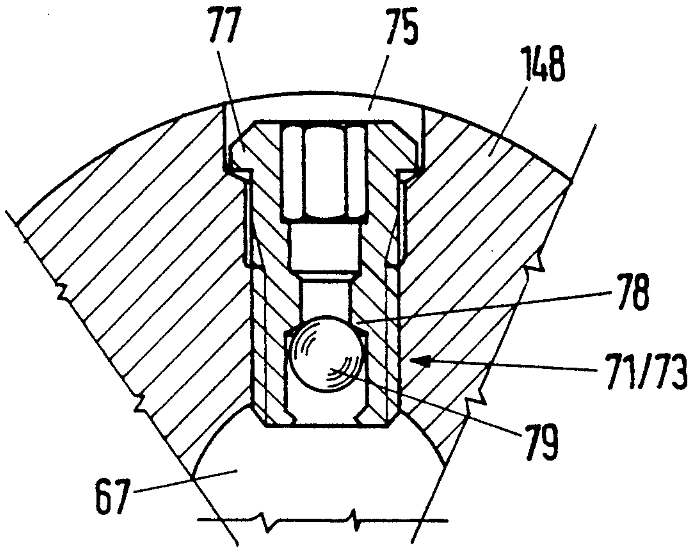
FIG. 7 is a longitudinal part-section through a check valve usable in accordance with the invention.

From a constructional point of view, the solution of FIG. 7 is recommended. Screwed into the radial passage 75 of the slide 148 there is an insert 77 with a valve seat 78 which co-operates with a valve ball 79. This forms the check valve 71/73.

By relieving the non-effective starting section, even without neutral position springs, one ensuren that the closure member of the change-over valve lifts off the seat facing the effective starting section and rapidly comes to lie on the seat facing the non-effective starting section. If at any time oil is compressed out of the spring chamber of the compensating valve 17 or the pressure regulator 7, this oil can always flow off, namely either by way of the one starting section to the load pressure sensing point or by way of the other starting section to the container. Nor is there a danger of pressure building up in that starting section for which a smaller over-pressure is set when it is in the non-effective condition, the pressure allowing the over-pressure valve to respond, through which a leakage flow could be set up which would momentarily reduce the load pressure in the effective starting section.

The same advantages are also achieved with the embodiment of FIGS. 11 to 14. This differs from that of FIGS. 6 to 10 only in the different form for the control valve 211. All parts remaining the same have retained their reference numerals. From the circuit diagram of FIG. 11 it will be evident that the non-effective starting sections 21 or 22 are connected to the container conduit 18 in the operative positions. For this purpose the bore 247 of the housing 246 and the slide 248 are longer than hitherto. In the housing, the load pressure control orifices 254 and 255 are axially extended outwardly. As a result, the mouths 65 and 66 of the connecting radial passages 63 and 64 remain in communication with the load pressure control orifices 254 or 255 when the slide moves outwardly out of the neutral position. The non-effective starting section 21 is therefore connected to the container control orifice 53 by way of 255-64-68-62. Correspondingly, the non-effective starting section 22 is connected to the container control orifice 52 by way of 254-63-67-61.

The drawing only shows horizontally operative piston motors. However the claimed control apparatus can also be applied to other motors, e.g. vertical piston motors and rotating motors.

Numerous elements that are conventional for such control apparatuses have not been illustrated, for example suction valves between the motor conduits and the container conduit. The same applies to valve arrangements for protecting the pump. The pump can have a constant conveying volume and be provided with a diverting pressure regulator. The control valves 11 could also be actuated other than manually, for example electrically, pneumatically or hydraulically. If one leads the starting sections 121 and 122 out of the valve block 2, as is shown on the right in FIG. 1, it is also possible to falsify the load pressure signal LS in relation to the correct load pressure by way of additional connections. One can achieve different effects in this way. Relieving the signal limits the load. Increasing the signal gives an increased flow to the motor and thus more rapid movement. Damping the signal, for example by means of a pressure accumulator, can smoothen oscillations brought about by the load.

Altogether, one obtains a load pressure sensing system which permits individual operations to be made on each motor conduit without having an influence on the other motor conduit of the same valve block or on other valve blocks supplied by the same pump.

We claim:

1. Control apparatus for controlling fluid flow between a pump having a pressure outlet and a pressure regulator, a container and a two way motor having a first and a second motor connection, comprising a two-directional control valve that includes a valve housing having a pump pressure orifice, first and second motor orifices, first and second container orifices and first and second load pressure control orifices and slide means mounted by the housing for movement between a neutral position blocking fluid flow from the pump orifice to any of the other of the above orifices, a first operative position for fluidly connecting the pump orifice to the first motor orifice and the first load pressure orifice, and the second motor or to the second container orifice, and a second operative position for fluidly connecting the pump orifice to the second motor orifice and the second load pressure orifice, and the first motor orifice to the first container orifice, a supply conduit for fluidly connecting the pump pressure outlet to the pump orifice, a discharge conduit fluidly connected to the container and having first and second branches fluidly connected to the first and second container orifices respectively, a pressure operable compensating valve in the supply conduit for retaining the pressure drop at the control valve substantially constant, load pressure means for at least in part controlling the operation of the compensating valve and having a load pressure conduit fluidly connected to the regulator, a first section connected to the second load pressure orifice and to the second motor orifice when the slide means is in its second position, and a second section connected to the first load pressure orifice and to the first motor orifice when the slide means is in its first position, a change over valve having first and second spaced end portions and a middle third portion fluidly connected to the compensating valve for applying an operating pressure thereto, the change over valve first end portion being fluidly connected to the first section and the change over valve second end portion being fluidly connected to the second section, the first and second sections having a first and a second throttle point respectively between the control valve and change over valve, a first over pressure valve for fluidly connecting the discharge conduit to the first section between the change over valve and the first throttle point, and a second over pressure valve for fluidly connecting the discharge conduit to the second section between the change over valve and the second throttle point, the first over pressure valve being openable for relieving over pressure at the first motor orifice and the second over pressure valve being openable for relieving over pressure at the second motor orifice, the load pressure conduit being fluidly connected between the compensating valve and the change over valve middle portion.

2. A control apparatus according to claim 1, characterized in that each over-pressure valve is adjustable.

3. A control apparatus according to claim 1, characterized in that the change over valve has a ball, two equal springs in the change over valve first and second portions for biasing the ball in opposite directions, the change over valve first portion including a first bushing supporting one of the springs and defining a first valve seat and an inlet opposite the first spring from the ball and the change over valve second portion including a second bushing joined to the first bushing and defining a second valve seat opposite to the ball from the first valve seat and an inlet opposite the second seat from the ball, the middle section having an outlet between the valve seats.

4. A control apparatus according to claim 1 wherein there is provided a valve block having the control, change over, over pressure and compensating valves therein.

5. A control apparatus according to claim 4 wherein there is provided a second valve block having the supply conduit, discharge conduit and load pressure conduit fluidly connected thereto and a second bidirectional motor having a first and a second connection fluidly connected to the second valve block.

6. A control apparatus according to claim 1, characterized in that the housing has a slide bore having the orifices opening thereto, and that the slide means comprises an axial slide mounted in the housing bore for axial movement between the slide means positions and having axially spaced first and second apertures, the first slide aperture in the slide means first operative position fluidly connecting the pump orifice to the first motor orifice, first and second sensing point radial passages axially opposite the slide apertures, a first connecting radial passage for opening to the first load orifice when the slide is in the slide means first operative position, and a second connecting radial passage for opening to the second load orifice when the slide is in the slide means second operative position, a first axial passage for fluidly connecting the first sensing point passage to the first connecting passage and a second axial passage for fluidly connecting the second sensing point passage to the second connecting passage.

7. A control apparatus according to claim 6, characterized in that the first load orifice is of an axial length that the first connecting passage remains in fluid communication therewith in both the slide means first and second positions.

8. A control apparatus according to claim 6, characterized in that the slide has first and second check valve radial passages between the respective first and second sensing point passages and the first and second connecting passages.

9. A control apparatus according to claim 6, characterized in that the slide has a first and a second insert and a first and a second check ball mounted by the respective insert that defines a respective first and second check valve passage to block radial outward fluid flow from the respective axial passage while permitting radial inward flow from the container orifices when the slide is in its first and second positions respectively.

10. A control apparatus according to claim 1, characterized in that the slide means has passage means for placing the first motor orifice in fluid communication with the first load pressure orifice when the slide means is in its first operative position.

11. A control apparatus according to claim 10, characterized in that the passage means includes check valve means blocking fluid flow therethrough from the first motor orifice to the first container orifice while permitting fluid flow therethrough from the second load pressure orifice to the second container orifice when the slide is in its first position and blocking fluid flow therethrough from the second motor orifice to the second container orifice while permitting fluid flow therethrough from the first load pressure orifice to the first container orifice when the slide is in its second position.

12. A control apparatus according to claim 10, characterized in that the passage means includes a first and a second load sensing passage in fluid communication with the first and second load sensing aperture respectively, a first and a second load relief aperture, and a first and a second check valve connection in fluid communication with the respective first and second relief aperture and opening toward the first and second passage respectively for conducting fluid to the respective container orifice.

* * * * *